United States Patent
Banerjee et al.

(10) Patent No.: US 9,715,047 B2
(45) Date of Patent: *Jul. 25, 2017

(54) MULTI-LAYER PHOTONIC STRUCTURES HAVING OMNI-DIRECTIONAL REFLECTIVITY AND COATINGS INCORPORATING THE SAME

(71) Applicant: Toyota Motor Corporation, Aichi-ken (JP)

(72) Inventors: Debasish Banerjee, Ann Arbor, MI (US); Benjamin Alan Grayson, Ann Arbor, MI (US); Minjuan Zhang, Ann Arbor, MI (US); Masahiko Ishii, Okazaki (JP)

(73) Assignee: Toyota Motor Corporation, Aichi-Ken (JP)

( * ) Notice: Subject to any disclaimer, the term of this patent is extended or adjusted under 35 U.S.C. 154(b) by 83 days.

This patent is subject to a terminal disclaimer.

(21) Appl. No.: 14/476,164

(22) Filed: Sep. 3, 2014

(65) Prior Publication Data

US 2015/0103397 A1    Apr. 16, 2015

Related U.S. Application Data

(63) Continuation of application No. 12/389,221, filed on Feb. 19, 2009, now Pat. No. 8,861,087, which is a
(Continued)

(51) Int. Cl.
*G02B 1/10*    (2015.01)
*G02B 5/08*    (2006.01)
(Continued)

(52) U.S. Cl.
CPC ............ *G02B 5/0825* (2013.01); *G02B 1/115* (2013.01); *G02B 5/0833* (2013.01); *G02B 5/26* (2013.01);
(Continued)

(58) Field of Classification Search
CPC .......... G02B 5/208; G02B 1/115; B82Y 20/00
(Continued)

(56) References Cited

U.S. PATENT DOCUMENTS 3,247,392 A    4/1966    Thelen
3,769,515 A    10/1973   Clark, Jr.
(Continued)

FOREIGN PATENT DOCUMENTS

CN    101105547    1/2008
JP    S58202408    11/1983
(Continued)

OTHER PUBLICATIONS

Office Action mailed Oct. 20, 2011 as it relates to U.S. Appl. No. 12/853,801.
(Continued)

*Primary Examiner* — Audrey Y Chang
(74) *Attorney, Agent, or Firm* — Dinsmore & Shohl LLP

(57) ABSTRACT

A multi-layer photonic structure may include alternating layers of high index material and low index material having a form $[H(LH)^N]$ where, H is a layer of high index material, L is a layer of low index material and N is a number of pairs of layers of high index material and layers of low index material. N may be an integer≥1. The low index dielectric material may have an index of refraction $n_L$ from about 1.3 to about 2.5. The high index dielectric material may have an index of refraction $n_H$ from about 1.8 to about 3.5, wherein $n_H > n_L$ and the multi-layer photonic structure comprises a reflectivity band of greater than about 200 nm for light having angles of incidence from about 0 degrees to about 80 degrees relative to the multi-layer photonic structure. The multi-layer photonic structure may be incorporated into a paint or coating system thereby forming an omni-directional reflective paint or coating.

20 Claims, 9 Drawing Sheets

Related U.S. Application Data continuation-in-part of application No. 11/837,529, filed on Aug. 12, 2007, now Pat. No. 7,903,339.

(51) Int. Cl.
  *G02B 1/115* (2015.01)
  *G02B 5/28* (2006.01)
  *G02B 5/26* (2006.01)
  *G02B 13/14* (2006.01)

(52) U.S. Cl.
  CPC ............... *G02B 5/28* (2013.01); *G02B 13/14* (2013.01); *G02B 13/143* (2013.01); *Y10T 428/24942* (2015.01)

(58) Field of Classification Search
  USPC ......... 359/359, 586, 350, 584, 589; 428/216
  See application file for complete search history.

(56) References Cited

U.S. PATENT DOCUMENTS

| | | |
|---|---|---|
| 3,885,408 A | 5/1975 | Clark, Jr. |
| 3,910,681 A | 10/1975 | Elliott et al. |
| 4,079,605 A | 3/1978 | Bartels |
| 4,449,126 A | 5/1984 | Pekker |
| 4,525,023 A | 6/1985 | Lawson |
| 4,556,599 A | 12/1985 | Sato et al. |
| 4,643,518 A | 2/1987 | Taniguchi |
| 4,673,914 A | 6/1987 | Lee |
| 4,714,308 A | 12/1987 | Sawamura et al. |
| 4,868,559 A | 9/1989 | Pinnow |
| 5,007,710 A | 4/1991 | Nakajima et al. |
| 5,043,593 A | 8/1991 | Tsutsumi et al. |
| 5,132,661 A | 7/1992 | Pinnow |
| 5,138,468 A | 8/1992 | Barbanell |
| 5,245,329 A | 9/1993 | Gokcebay |
| 5,279,657 A | 1/1994 | Phillips et al. |
| 5,283,431 A | 2/1994 | Rhine |
| 5,323,416 A | 6/1994 | Bhat et al. |
| 5,491,470 A | 2/1996 | Veligdan |
| 5,543,665 A | 8/1996 | Demarco |
| 5,561,420 A | 10/1996 | Kleefeldt et al. |
| 5,571,624 A | 11/1996 | Phillips et al. |
| 5,653,792 A | 8/1997 | Phillips et al. |
| 5,691,844 A | 11/1997 | Oguchi et al. |
| 5,850,309 A | 12/1998 | Shirai et al. |
| 5,889,603 A | 3/1999 | Roddy et al. |
| 6,049,419 A | 4/2000 | Wheatley et al. |
| 6,055,079 A | 4/2000 | Hagans et al. |
| 6,130,780 A * | 10/2000 | Joannopoulos ........ B82Y 20/00 359/359 |
| 6,156,115 A | 12/2000 | Pfaff et al. |
| 6,180,025 B1 | 1/2001 | Schoenfeld et al. |
| 6,331,914 B1 | 12/2001 | Wood, II et al. |
| 6,387,457 B1 | 5/2002 | Jiang et al. |
| 6,399,228 B1 | 6/2002 | Simpson |
| 6,433,931 B1 | 8/2002 | Fink et al. |
| 6,565,770 B1 | 5/2003 | Mayer et al. |
| 6,574,383 B1 | 6/2003 | Erchak et al. |
| 6,618,149 B1 | 9/2003 | Stirton |
| 6,624,945 B2 | 9/2003 | Fan et al. |
| 6,641,874 B2 | 11/2003 | Kuntz et al. |
| 6,665,770 B2 | 12/2003 | Koga |
| 6,667,095 B2 | 12/2003 | Wheatley et al. |
| 6,873,393 B2 | 3/2005 | Ma |
| 6,887,526 B1 | 5/2005 | Arit et al. |
| 6,894,838 B2 | 5/2005 | Mizrahi et al. |
| 6,903,873 B1 * | 6/2005 | Joannopoulos ........ B82Y 20/00 359/359 |
| 6,927,900 B2 | 8/2005 | Liu et al. |
| 6,997,981 B1 | 2/2006 | Coombs et al. |
| 7,098,257 B2 | 8/2006 | Rink et al. |
| 7,123,416 B1 | 10/2006 | Erdogan et al. |
| 7,141,297 B2 | 11/2006 | Condo et al. |
| 7,184,133 B2 | 2/2007 | Coombs et al. |
| 7,190,524 B2 | 3/2007 | Grawert et al. |
| 7,215,473 B2 | 5/2007 | Fleming |
| 7,267,386 B2 | 9/2007 | Hesch |
| 7,367,691 B2 | 5/2008 | Lin |
| 7,410,685 B2 | 8/2008 | Rosenberger et al. |
| 7,446,142 B2 | 11/2008 | Meisenburg et al. |
| 7,483,212 B2 | 1/2009 | Cho et al. |
| 7,903,339 B2 | 3/2011 | Banerjee et al. |
| 7,980,711 B2 | 7/2011 | Takayanagi et al. |
| 8,203,787 B2 | 6/2012 | Atsuta et al. |
| 2001/0022151 A1 | 9/2001 | Sliwinski et al. |
| 2002/0129739 A1 | 9/2002 | Yanagimoto et al. |
| 2003/0059549 A1 | 3/2003 | Morrow et al. |
| 2004/0047055 A1 | 3/2004 | Mizrahi et al. |
| 2004/0156984 A1 | 8/2004 | Vitt et al. |
| 2004/0179267 A1 | 9/2004 | Moon et al. |
| 2004/0246477 A1 | 12/2004 | Moon et al. |
| 2004/0263983 A1 | 12/2004 | Acree |
| 2004/0265477 A1 | 12/2004 | Nabatova-Gabain et al. |
| 2005/0126441 A1 | 6/2005 | Skelhorn |
| 2005/0235714 A1 | 10/2005 | Lindstrom |
| 2006/0030656 A1 | 2/2006 | Tarng et al. |
| 2006/0081858 A1 | 4/2006 | Lin et al. |
| 2006/0159922 A1 | 7/2006 | O'Keefe |
| 2006/0222592 A1 | 10/2006 | Burda |
| 2007/0221097 A1 | 9/2007 | Tarng et al. |
| 2008/0013178 A1 | 1/2008 | Terada |
| 2009/0046368 A1 | 2/2009 | Banerjee et al. |
| 2009/0082659 A1 | 3/2009 | Ham et al. |
| 2009/0153953 A1 | 6/2009 | Banerjee et al. |
| 2009/0303044 A1 | 12/2009 | Funichi et al. |
| 2010/0208338 A1 | 8/2010 | Banerjee et al. |
| 2010/0209593 A1 | 8/2010 | Banerjee et al. |
| 2010/0213485 A1 | 8/2010 | McKenzie et al. |

FOREIGN PATENT DOCUMENTS

| | | |
|---|---|---|
| JP | 05317119 | 3/1993 |
| JP | 2000329933 A | 11/2000 |
| JP | 2001315243 | 11/2001 |
| JP | 2002504711 | 2/2002 |
| JP | 2004133004 | 4/2004 |
| JP | 2005144925 | 6/2005 |
| JP | 2006097426 | 4/2006 |
| JP | 2007065232 | 3/2007 |
| JP | 2007113091 | 5/2007 |
| JP | 2008015240 | 1/2008 |
| JP | 2008038382 | 2/2008 |
| JP | 2008118718 | 5/2008 |
| JP | 2000220331 | 8/2008 |
| JP | 2009180166 | 8/2009 |
| JP | 20080020563 | 8/2009 |
| WO | WO02054030 | 7/2002 |
| WO | WO03062871 | 3/2003 |

OTHER PUBLICATIONS

Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010.

Bendiganavale A.K., Malshe, V.C., "Infrared Reflective Inorganic Pigments", Recent Patents on Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

Maier, E.J. "To Deal With the Invisible": On the biological significance of ultraviolet sensitivity in birds. Naturwissenschaften 80: 476-478, 1993.

Nison, J., "Twinkle, Twinkle Little Star," Asia Pacific Coating Journal, Feb. 2004.

Fink, Joel "A Dielectric Omnidirectional Reflector", E.L. Thomas, Science, vol. 282, Nov. 27, 1988.

Lin, Weihua, "Design and Fabrication of Omnidirectional Reflectors in the Visible Range" Journal of Modern Optics, vol. 52, No. 8, 1155 (2005).

(56) References Cited

OTHER PUBLICATIONS

Chen, Kevin M. "Si02/Ti02 Omnidirectional Reflector and Microcavity Resonator Via the Sol-Gel Method", Appl. Phys. Lett., vol. 75, No. 24, Dec. 13, 1999.
Almedia, R.M.,"Photonic Bandgap Materials and Structures by Sol-Gel Processing", Journal of Non-Crystalline Solids, 405-499 (2003).
Deopura, M., "Dielectric Omnidirectional Visible Reflector," Optics Letters, Aug. 1, 2001, vol. 16, No. 15.
Decourby, R.G., "Planar Omnidirectional Reflectors in Chalcogenide Glass and Polymer" Optics Express, 6228, Aug. 8, 2005.
Clement, T.J., "Improved Omnidirectional Reflectors in Chalcogenide Glass and Polymer by Using the Silver Doping Technique", Optics Express, 14, 1789 (2006).
Bruyant, A., "All-Silicon Omnidirectional Mirrors Based On One-Dimensional Crystals", Appl. Phys. Lett. vol. 82, No. 19, May 12, 2003.
Chigrin, D.N., "Observation of Total Omnidirectional Reflection From a One-Dimensional Dielectric Lattice", Appl. Phys. A. 68, 25-28 (1999).
Park, Y., "GaAs-based Near-infrared Omnidirectional Reflector", Appl. Phys. Lett., vol. 82, No. 17, Apr. 28, 2003.
H-Y Lee, "Design and Evaluation of Omnidirectional One-Dimensional Photonic Crystals", Journal of Appl. Phys. vol. 93, No. 2, Jan. 15, 2003.
Banerjee, Debasish, "Narrow-band Omnidirectional Structural Color", SAE World Congress 01-1049 (2008).
U.S. Appl. No. 12/686,861, filed Jan. 13, 2010 entitled "Multilayer Photonic Structures."
U.S. Appl. No. 12/853,801, filed Aug. 10, 2010 entitled "Methods for Identifying Articles of Manufacture".
Office Action mailed Sep. 22, 2011 as it relates to U.S. Appl. No. 12/853,718.
Office Action mailed Feb. 22, 2012 as it relates to U.S. Appl. No. 12/902,763.
Notice of Allowance mailed May 16, 2012 as it relates to U.S. Appl. No. 12/853,718.
Office Action mailed Apr. 11, 2012 as it relates to U.S. Appl. No. 12/389,256.
Office Action mailed Mar. 28, 2012 as it relates to U.S. Appl. No. 12/853,801.
Notice of Allowance mailed May 29, 2012 as it relates to U.S. Appl. No. 12/853,801.
International Search Report for PCT/US2010/022378 mailed Mar. 30, 2010.
Hongqiang et al., "Disordered dielectric high reflectors with broadband from visible to infrared," Applied Physics Letters, American Institute of Physics, Melville, NY, US. vol. 74, No. 22, dated May 31, 2009.
Xifre-Perez et al., "Porous silicon mirrors with enlarged omnidirectional band gap," Journal of Applied Physics, American Institute of Physics, Melville, NY, US, vol. 97, No. 6, dated Mar. 9, 2005.
Office Action mailed on Jan. 6, 2014 in U.S. Appl. No. 12/902,763.
Rejection dated Dec. 5, 2012, including portions translated to English, filed in Chinese Application No. 201080007817.1.
Rejection dated Mar. 5, 2013, including portions translated to English, filed in Japanese Application No. 2011173986.
Office Action mailed Oct. 17, 2012 filed in U.S. Appl. No. 12/686,861.
Notice of Allowance dated Apr. 25, 2013, filed in U.S. Appl. No. 12/686,861.

\* cited by examiner

MULTI-LAYER PHOTONIC STRUCTURES HAVING OMNI-DIRECTIONAL REFLECTIVITY AND COATINGS INCORPORATING THE SAME

CROSS REFERENCE TO RELATED APPLICATIONS

This application is a Continuation of U.S. patent application Ser. No. 12/389,221 entitled "MULTI-LAYER PHOTONIC STRUCTURES HAVING OMNI-DIRECTIONAL REFLECTIVITY AND COATINGS INCORPORATING THE SAME" filed Feb. 19, 2009, which is a Continuation-In-Part of U.S. patent application Ser. No. 11/837,529 entitled "NARROW BAND OMNI-DIRECTIONAL REFLECTORS AND THEIR USE AS STRUCTURAL COLORS" filed Aug. 12, 2007, each of which are hereby incorporated by reference.

TECHNICAL FIELD

The present invention generally relates to multi-layer photonic structures and, more specifically, multi-layer photonic structures having omni-directional reflectivity for a broad range of wavelengths in the electromagnetic spectrum and coatings comprising the same.

BACKGROUND

Sunlight comprises a range of wavelengths in the electromagnetic spectrum including ultraviolet (UV), visible, and infrared (IR) light. The color of a pigment associated with a particular object is determined by the wavelengths of light reflected by the pigment and observed by the human eye. For example, sunlight or white light comprises a roughly equal mixture of wavelengths in the visible spectrum. When white light is incident on a pigment, some wavelengths of the white light are absorbed while others are reflected. The reflected wavelengths determine the color of the pigment. For many pigments, reflectivity may be strongly dependent on the angle of the light incident on the object. Accordingly, the pigment may reflect different wavelengths of light for different angles of incidence while absorbing others. As such, the pigment may not necessarily behave as an omni-directional reflector for all wavelengths of light at all angles of incidence. This results in the pigment having a color shift for different angles of incident light.

Similar effects may be found with UV and IR light. Specifically, for different angles of incidence, a pigment may reflect certain wavelengths of UV and/or IR light while absorbing others which may result in undesirable effects. For example, when UV light is absorbed by a polymeric material, the polymeric material may break down the chemical bonds of the polymer. This process is called photo-degradation and may cause cracking, chalking, color change and/or the loss of physical properties of the polymeric material. Similarly, near IR sunlight (780 nm-2100 nm) carries 53% of the total solar energy, which, when absorbed, causes heat to build up on the surface of the object which may result in undesirable thermal conditions. On certain objects, such as automobiles, buildings and other structures, this build-up of heat may reduce the efficiency and/or performance of certain systems such as, for example, HVAC systems.

Accordingly, coatings which reflect at least UV and IR light omni-directionally may be desirable.

SUMMARY

In one embodiment, a multi-layer photonic structure may include alternating layers of high index material and low index material having a form $[H(LH)^N]$ where, H is a layer of high index material, L is a layer of low index material and N is a number of pairs of layers of high index material and layers of low index material. N may be an integer$\geq 1$. The low index dielectric material may have an index of refraction $n_L$ from about 1.3 to about 2.5. The high index dielectric material may have an index of refraction $n_H$ from about 1.8 to about 3.5, wherein $n_H > n_L$ and the multi-layer photonic structure comprises and a reflectivity band of greater than about 200 nm for light having angles of incidence from about 0 degrees to about 80 degrees relative to the multi-layer photonic structure. The multi-layer photonic structure may be incorporated into a paint or coating system thereby forming an omni-directional reflective paint or coating.

In another embodiment, a UV-IR reflective multilayer photonic structure may include layers of high index material and low index material having a form $[0.5 L H(LH)^N 0.5 L]$ where H is a layer of high index dielectric material, L is a layer of the low index dielectric material and N is the number pairs of layers of high index material and layers of low index materials. N may be an integer$\geq 1$. The low index dielectric material may have an index of refraction $n_L$ from about 1.3 to about 2.5. The high index dielectric material may have an index of refraction $n_H$ from about 1.8 to about 3.5, wherein $n_H > n_L$. For angles of incidence from about 0 degrees to about 80 degrees, the multi-layer photonic structure may include a reflectivity band greater than about 300 nm for light in the infrared spectrum, a reflectivity band greater than about 50 nm for light in the ultraviolet spectrum. Further, the multi-layer photonic structure may be substantially transparent to visible light for angles of incidence from about 0 degrees to about 15 degrees.

In yet another embodiment, an article of manufacture may include a broadband omni-directionally reflective coating with at least one reflectivity band having a bandwidth greater than about 250 nm for angles of light incident on the coating from about 0° to about 80°. The coating may include a binder and a plurality of multi-layer photonic structures dispersed in the binder, wherein the multi-layer photonic structures have a range to mid-range value from about 20% to about 50% and at least one reflectivity band having a bandwidth greater than about 250 nm for angles of light incident on the multilayer photonic structure from about 0° to at least about 45°.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 6:
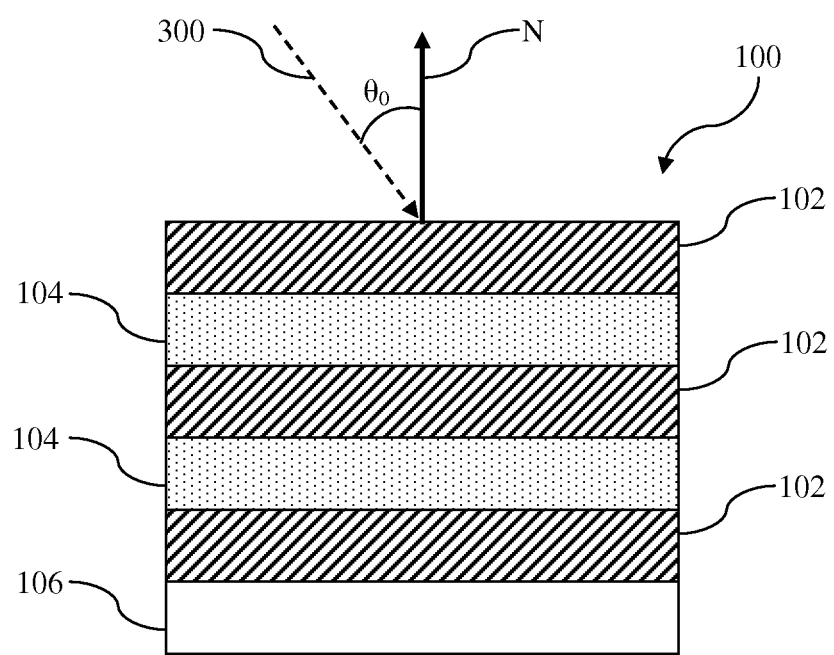
FIG. 6 is a schematic illustration of one embodiment of a multi-layer photonic structure for use as a wide-band gap, omni-directional reflector.

FIG. 6 generally depicts one embodiment of a multi-layer photonic structure which may be used as an omni-directional reflector for various wavelengths of ultraviolet, visible and infrared light. The multi-layer photonic structure may generally comprise alternating layers of relatively high refractive index materials and relatively low refractive index materials deposited on a substrate. The structure and properties of various multi-layer photonic structures having omni-directional reflectivity, methods of designing the structures, and applications in which the structures may be employed will be described in more detail herein.

The multi-layer photonic structures described herein may be used to omni-directionally reflect given wavelengths of light incident on the structure over a range of angles of incidence. The various conditions for omni-directional reflectivity for a multi-layer photonic structure will now be described with respect to the exemplary multi-layer photonic structure shown in FIG. 1. It will be understood that the terms "electromagnetic wave," "electromagnetic radiation," and "light," as used herein, may interchangeably refer to various wavelengths of light incident on a multi-layer photonic structure and that such light may have wavelengths in the ultra-violet (UV), infrared (IR) and visible portions of the electromagnetic spectrum.

Figure 1:
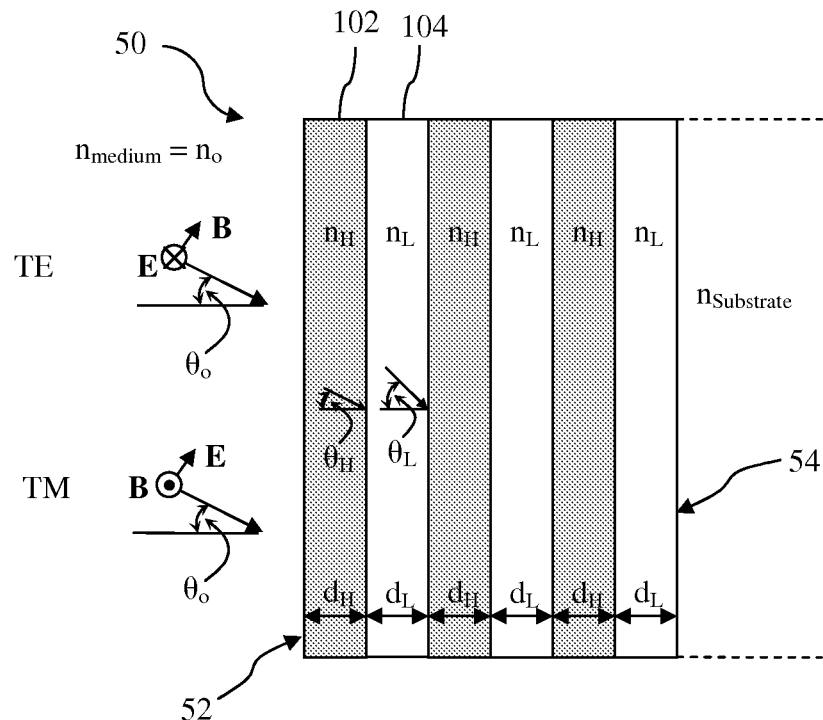
FIG. 1 is an schematic illustration of a multi-layer photonic structure comprising alternating layers of high index and low index materials.

Referring to FIG. 1, an electromagnetic wave consisting of perpendicular electric (E) and magnetic (M) vector components is shown incident to the multi-layer photonic structure 50 at an incident angle $\theta_0$. The electromagnetic wave comprises two independent electromagnetic modes: a transverse electric (TE) mode and a transverse magnetic (TM) mode. The refractive index of adjacent to the multi-layer photonic structure 50 at a first end 52 is $n_0$. For example, when the medium is air, $n_0=1$. The refractive index of an optional substrate at a second end 54 is $n_{substrate}$. The optional substrate can be any material compatible with the multi-layer photonic structure 50 and can assist in the manufacture, storage, shipping and/or handling of the structure. If an optional substrate is present, it may or may not be removed after the manufacture of the multi-layer photonic structure 50.

When electromagnetic radiation, such as light, impacts the surface of a material, waves of the radiation can be reflected from or transmitted through the material. Furthermore, when the light is incident on the first end 52 of the multi-layer photonic structure 50 at the angle $\theta_0$, the light is refracted by the layers of high and low index material 102, 104) such that the angle of refraction is $\theta_H$ and $\theta_L$, respectively. Using Snell's law:

$$n_0 \sin\theta_0 = n_L \sin\theta_L = n_H \sin\theta_H \quad (1)$$

the angles $\theta_H$ and $\theta_L$ can be determined if the refractive indices $n_H$ and $n_L$ are known.

One condition for omni-directional reflectivity is that the TE mode and the TM mode of the electromagnetic radiation have a maximum angle of refraction ($\theta_{H,MAX}$) inside the first layer which is less than the Brewster angle ($\theta_B$) of the interface between the first layer and the second layer. The Brewster angle, as used herein, is the angle of incidence at which light with a particular polarization is transmitted through a surface without being reflected. The Brewster angle $\theta_B$ may be determined by the Brewster equation (e.g., Equation (3) below). If the maximum angle of refraction is not less than the Brewster angle, the TM mode of the electromagnetic waves will not be reflected at the second and all subsequent interfaces and thus will transmit through the structure. Accordingly:

$$\sin\theta_{H,Max} = \frac{n_0}{n_H}, \quad (2)$$

and $$\tan\theta_B = \frac{n_L}{n_H}, \quad (3)$$

such that $$n_0 < \frac{n_H n_L}{\sqrt{n_H^2 + n_L^2}} \quad (4)$$

in order for omni-directional reflectivity to occur.

In addition to the necessary condition for omni-directional reflectivity represented by Equation (4), if electromagnetic radiation having a wavelength λ falls on a multi-layer photonic structure with an angle of incidence $\theta_0$, and the individual bi-layers of the multi-layer photonic structure have thicknesses $d_H$ and $d_L$ with respective refractive indices $n_H$ and $n_L$, the characteristic translation matrix ($F_T$) of the multi-layer photonic structure can be expressed as:

$$F_T = \frac{1}{1+\rho_T}\begin{vmatrix} e^{i\delta_L} & \rho_T e^{-i\delta_L} \\ \rho_T e^{i\delta_L} & e^{-i\delta_L} \end{vmatrix} \times \frac{1}{1-\rho_T}\begin{vmatrix} e^{i\delta_H} & \rho_T e^{-i\delta_H} \\ \rho_T e^{i\delta_H} & e^{-i\delta_H} \end{vmatrix}. \quad (5)$$

Equation (5) may also be written as:

$$F_T = \frac{1}{1-\rho_T^2}\begin{vmatrix} e^{i(\delta_L+\delta_H)} - \rho_T^2 e^{-i(\delta_H-\delta_L)} & -2i\rho_T e^{-i\delta_H}\sin\delta_L \\ 2i\rho_T e^{i\delta_H}\sin\delta_L & e^{-i(\delta_L+\delta_H)} - \rho_T^2 e^{-i(\delta_H-\delta_L)} \end{vmatrix}, \quad (6)$$

where:

-continued $$\delta_H = \frac{2\pi}{\lambda} n_H d_H \cos\theta_H, \quad (7)$$

$$\delta_L = \frac{2\pi}{\lambda} n_L n_L \cos\theta_L, \quad (8)$$

$$\cos\theta_H = \sqrt{1 - \frac{n_o^2 \sin^2\theta_0}{n_H^2}}, \text{ and} \quad (9)$$

$$\cos\theta_L = \sqrt{1 - \frac{n_o^2 \sin^2\theta_0}{n_L^2}}. \quad (10)$$

In addition, $$\rho_T = \frac{n_{HT} - n_{LT}}{n_{HT} + n_{LT}}, \quad (11)$$

where:

$$n_{HT} = \begin{cases} \frac{n_H}{\cos\theta_H} \\ n_H \cos\theta_H \end{cases} \quad (12)$$

for TM and TE polarizations, respectively, and $$n_{LT} = \begin{cases} \frac{n_L}{\cos\theta_L} \\ n_L \cos\theta_L \end{cases} \quad (13)$$

for TM and TE polarizations, respectively. Solving $\rho_T$ for TM and TE polarizations yields:

$$\rho_{TM} = \frac{n_H \cos\theta_L - n_L \cos\theta_H}{n_H \cos\theta_L + n_L \cos\theta_H}, \text{ and} \quad (14)$$

$$\rho_{TE} = \frac{n_H \cos\theta_H - n_L \cos\theta_L}{n_H \cos\theta_H + n_L \cos\theta_L}. \quad (15)$$

A viewing angle (or angle of incidence) dependent band structure for the multi-layer photonic structure can be obtained from the boundary conditions for an edge of the structure, also known as the band edge, of the total reflection zone. As used herein, band edge is defined as the equation for the line that separates the total reflection zone from the transmission zone for the given band structure. A boundary condition that determines the band edge frequencies of the high reflectance band can be determined by setting the trace of the characteristic translational matrix to −1 such that:

$$\text{Trace}|F_T| = -1 \quad (16).$$

Accordingly, based on Equation (3), $$\frac{\cos(\delta_H + \delta_L) - \rho_T^2 \cos(\delta_H - \delta_L)}{1 - \rho_T^2} = -1, \quad (17)$$

which may be expressed as:

$$\cos^2\left(\frac{\delta_H + \delta_L}{2}\right) = \rho_T^2 \cos^2\left(\frac{\delta_H - \delta_L}{2}\right). \quad (18)$$

Combining equations (15) and (7) yields the band edge equation such that $$\cos\left(\frac{\pi L_+}{\lambda}\right) = \pm |\rho_T| \cos\left(\frac{\pi L_-}{\lambda}\right). \quad (19)$$

where $$L_+ = n_H d_H \cos\theta_H + n_L d_L \cos\theta_L \quad (20) \text{ and}$$

$$L_- = n_H d_H \cos\theta_H - n_L d_L \cos\theta_L \quad (21).$$

The + sign in Equation (19) shown above represents the band edge for the long wavelength ($\lambda_{long}$) and the − sign represents the band edge for the short wavelength ($\lambda_{short}$). Accordingly, for the TE polarization, $$\cos\left(\frac{\pi L_+}{\lambda_{long}}\right) = +|\rho_{TE}| \cos\left(\frac{\pi L_-}{\lambda_{long}}\right) \text{ and} \quad (22)$$

$$\cos\left(\frac{\pi L_+}{\lambda_{Short}}\right) = -|\rho_{TE}| \cos\left(\frac{\pi L_-}{\lambda_{Short}}\right)$$

while, for the TM polarization:

$$\cos\left(\frac{\pi L_+}{\lambda_{long}}\right) = +|\rho_{TM}| \cos\left(\frac{\pi L_-}{\lambda_{long}}\right) \text{ and} \quad (23)$$

$$\cos\left(\frac{\pi L_+}{\lambda_{Short}}\right) = -|\rho_{TM}| \cos\left(\frac{\pi L_-}{\lambda_{Short}}\right).$$

An approximate solution of the band edge can be determined by the following expression:

$$L_- = n_H d_H \cos\theta_H - n_L d_L \cos\theta_L \sim 0 \quad (24)$$

This approximate solution is reasonable when considering a quarter wave design (described in greater detail below) where the optical thicknesses of each layer of high index and low index materials are chosen to be equal to each other. In addition, relatively small differences in the optical thicknesses of the alternating layers provides a cosine term close to unity. Thus, Equations (23) and (24) yield approximate band edge equations:

$$\lambda_{long}(\theta_0) = \frac{\pi L_+(\theta_0)}{\cos^{-1}|\rho_{TE}(\theta_0)|} \text{ and} \quad (25)$$

$$\lambda_{long}(\theta_0) = \frac{\pi L_+(\theta_0)}{\cos^{-1}(-|\rho_{TE}(\theta_0)|)}$$

for the TE mode and $$\lambda_{long}(\theta_0) = \frac{\pi L_+(\theta_0)}{\cos^{-1}|\rho_{TM}(\theta_0)|} \text{ and} \quad (26)$$

$$\lambda_{long}(\theta_0) = \frac{\pi L_+(\theta_0)}{\cos^{-1}(-|\rho_{TM}(\theta_0)|)}$$

for the TM mode.

Values for $L_+$ and $\rho_{TM}$ as a function of incident angle $\theta_0$ can be obtained from equations 7, 8, 14, 15, 20 and 21, thereby allowing calculations for $\lambda_{long}$ and $\lambda_{short}$ in the TE and TM modes as a function of incident angle.

Figure 2:
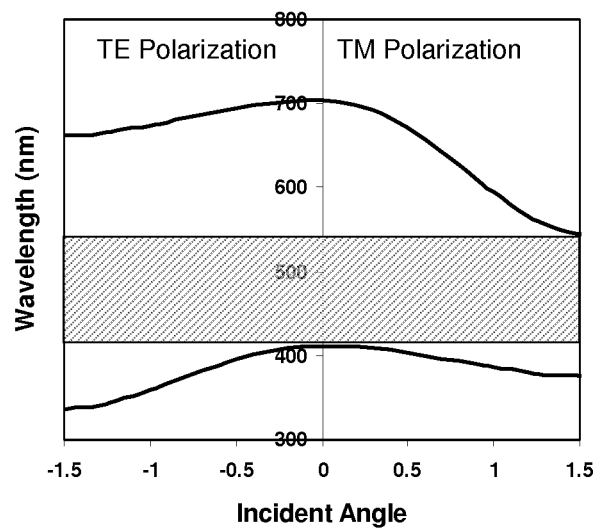
FIG. 2 graphically depicts the calculated band structure of a multi-layer photonic structure.

Turning to FIG. 2, the photonic band structure of one embodiment of a multi-layer photonic structure is depicted. Specifically, FIG. 2 depicts the TE and TM band edges as a function of incident angle on a multilayer system with a first material having a high refractive index equal to 3.5 and a thickness of 37.14 nanometers and a second layer of material with a refractive index of 1.5 and a thickness of 130 nanometers. The omni-directional band (e.g., the shaded area extending between the band edges) is defined by the wavelength range where electromagnetic radiation coming from any angle will be completely reflected. However, it should be understood that various other wavelengths of incident light may also be completely reflected depending on the angle of incidence of the light. For example, as shown in FIG. 2, light having a wavelength from about 400 nm to about 650 nm may be completely reflected when the angle of incidence is from about 0° (0 radians) to about 45° (0.75 radians). Mathematically, the omni-directional band shown in FIG. 2 can be written as:

$$\Delta \lambda_{Omni} = \lambda_{Long}^{TM}(90°) - \lambda_{short}^{TE}(90°) \quad (27)$$

An exact solution to the band edge equations (e.g., Equation (23) and Equation (24)) may be represented as:

$$\lambda_{long}(\theta_0) = \frac{\pi L_+(\theta_0)}{\cos^{-1}\left|\rho_{TE}(\theta_0)\cos\left(\frac{\pi L_-}{\lambda_{Long}}\right)\right|} \text{ and} \quad (28)$$

$$\lambda_{Short}(\theta_0) = \frac{\pi L_+(\theta_0)}{\cos^{-1}\left|\rho_{TE}(\theta_0)\cos\left(\frac{\pi L_-}{\lambda_{Short}}\right)\right|}$$

for the TE mode, and:

$$\lambda_{long}(\theta_0) = \frac{\pi L_+(\theta_0)}{\cos^{-1}\left|\rho_{TM}(\theta_0)\cos\left(\frac{\pi L_-}{\lambda_{Long}}\right)\right|} \text{ and} \quad (29)$$

$$\lambda_{Short}(\theta_0) = \frac{\pi L_+(\theta_0)}{\cos^{-1}\left|\rho_{TM}(\theta_0)\cos\left(\frac{\pi L_-}{\lambda_{Short}}\right)\right|}$$

for the TM mode.

The center wavelength $\lambda_c$ of an omni-directional reflector is the wavelength of light about which the omni-directional reflectivity band is centered. The center wavelength may be determined from the relation:

$$\lambda_c = 2(n_H d_H \cos\theta_H + n_L d_L \cos\theta_L) \quad (30).$$

The center wavelength indicates the approximate range of electromagnetic wavelength and/or color spectrum which may be reflected by the omni-directional reflector.

Figure 3:
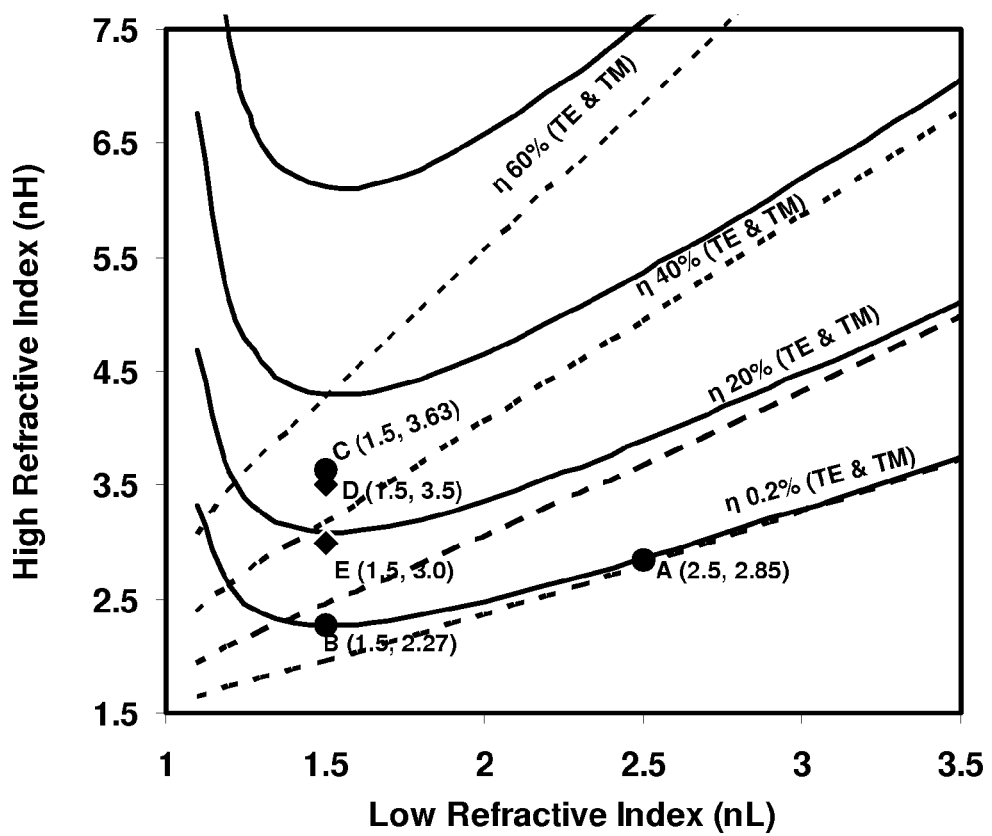
FIG. 3 is a graphical representation of range to midrange ratios $\eta_{TM}$ (solid lines) and $\eta_{TE}$ (dashed lines) of the transverse magnetic mode and the transverse electric mode, respectively, for electromagnetic radiation incident on a multi-layer photonic structure for values of $\eta_{TM}$ and $\eta_{TE}$ ranging from 0.2% to 60%.

Another parameter that may provide an indication as to the width of a reflection band is the ratio of the range of wavelengths within the omni-directional reflection band to the mid-range of wavelengths within the omni-directional reflection band. This "range to mid-range ratio" ($\eta$) may be mathematically expressed as:

$$\eta_{TE} = 2\frac{\lambda_{long}^{TE}(\theta_0 = 90°) - \lambda_{Short}^{TE}(\theta_0 = 0°)}{\lambda_{long}^{TE}(\theta_0 = 90°) + \lambda_{Short}^{TE}(\theta_0 = 0°)} \quad (31)$$

for the TE mode, and $$\eta_{TM} = 2\frac{\lambda_{long}^{TM}(\theta_0 = 90°) - \lambda_{Short}^{TM}(\theta_0 = 0°)}{\lambda_{long}^{TM}(\theta_0 = 90°) + \lambda_{Short}^{TM}(\theta_0 = 0°)} \quad (32)$$

for the TM mode. It will be understood that the range to mid-range ratio may be expressed as a percentage and that the terms range to mid-range ratio and range to mid-range ratio percentage are used interchangeably. It is further appreciated that a 'range to mid-range ratio' value provided herein having a '%' sign following is a percentage value of the range to mid-range ratio. The range to mid-range ratios for the TM mode and TE mode can be numerically calculated from Equations (31) and (32) and plotted as a function of high refractive index and low refractive index, as illustrated in FIG. 3. Furthermore, once the range to mid-range ratio has been determined, the corresponding reflectance may be determined, as described below in Appendix A, and plotted as a function of the wavelength of incident light. The reflectance spectra for different embodiments of multi-layer photonic structures described herein are graphically illustrated for various angles of incidence in FIGS. 4A-4C, 7 and 9.

Regarding the center wavelength of the omni-directional reflector, Equation (30) demonstrates that the center wavelength, and therefore the dispersion of the center wavelength, is a function of the incidence angle. In some instances, the omni-directional reflectors described herein have a small dispersion of the center wavelength as a function of the incidence angle. The narrower the range of the dispersion of the center wavelength, the purer the observed color since a more narrow band of wavelengths are reflected from the reflector to, for example, a human eye.

The dispersion of the center wavelength may be controlled by comparing the range to mid-range ratios for the TM mode and the TE mode as a function of high refractive indices and low refractive indices. FIG. 3 illustrates range to mid-range ratios of 0.2%, 20%, 40% and 60% for the TM mode and the TE mode as a function of high refractive index and low refractive index. By plotting the range to mid-range ratio as a function of the high and low refractive indices, refractive indices may be chosen to effect a desired bandwidth for the omni-directional reflector. Further, when the difference between range to mid-range ratio of the TE and TM modes is relatively large, a wider omni-directional reflectivity band is produced in the multi-layer photonic structure.

Figure 4A:
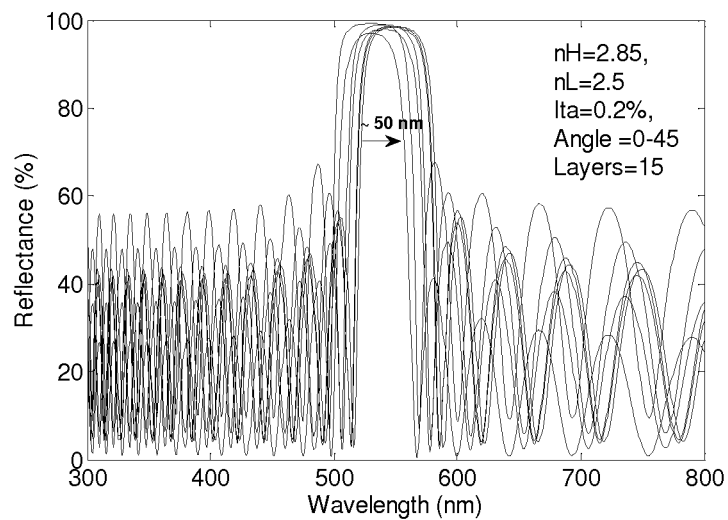
FIG. 4A-4C are exemplary reflectance spectra for points A, B, and C of FIG. 3.
Figure 4B:
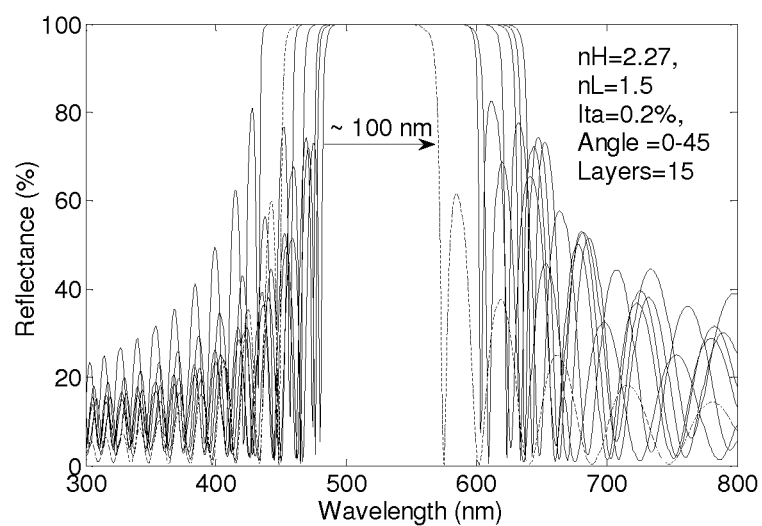
Figure 4C:
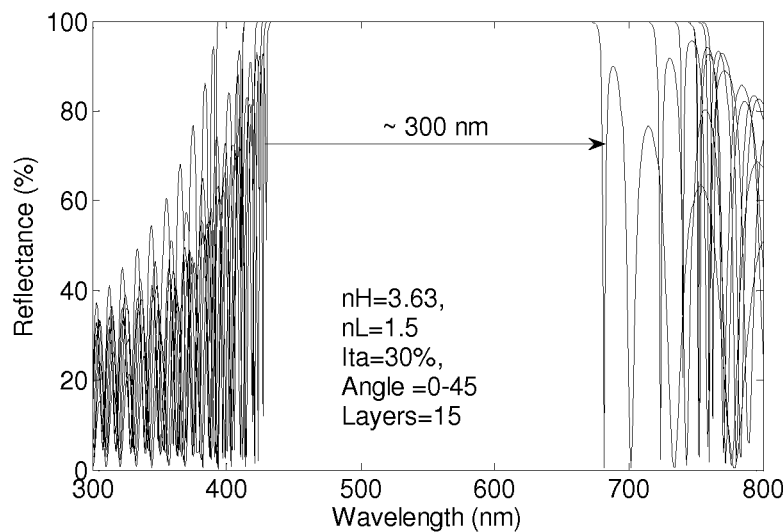

Referring now to FIGS. 3 and 4A-4C for purposes of illustration, FIG. 3 shows 5 points (A, B, C, D and E) for different range to mid-range ratios. Points A and B have a range to mid-range ratio of about 0.2% while point C has a range to mid-range ratio of about 30%. Using the transfer matrix method described in Appendix A, the reflectance for points A, B and C were plotted as a function of various angles of incidence from about 0° to about 45°. These plots are shown at FIGS. 4A-4C. FIG. 4A shows that the bandwidth for point A is about 50 nm (e.g., point A satisfies a narrow bandwidth condition) while point B has a bandwidth of about 100 nm (shown in FIG. 4B). Accordingly, as the difference between the TE and TM mode increase for a given range to mid-range value, so to does the bandwidth of the reflectivity band. Further, point C, which has a range to mid-range value of about 30%, has a bandwidth of about 300 nm (shown in FIG. 4C). Accordingly, as the range to mid-range value of a multi-layer photonic structure increases, the reflectivity band of the structure also increases. The broadband omni-directionally reflective multi-layer photonic structures described herein will generally have a range to mid-range ratio from about 20% to about 50% to yield a reflectivity band of greater than about 250 nm.

FIGS. 4A-4C also illustrate the effect of index contrast on dispersion of the center wavelength. Referring to the reflectance spectra for point C, shown in FIG. 4C, the center wavelength shifts significantly when electromagnetic radiation incident normal to the multi-layer photonic structure is compared to electromagnetic radiation incident 45° to the structure. In contrast, a relatively small difference between the high refractive index and the low refractive index, and equivalent angles of incidence, results in a small dispersion of the center wavelength as illustrated by the reflectance spectra for point A. Therefore, in order to minimize the dispersion of the center wavelength of a multi-layer photonic structure, the high and low index materials should be selected in order to minimize the refractive index contrast.

Thus, from equation 30, the dispersion of the center wavelength can be expressed as:

$$\Delta\lambda_c = \lambda_c|_{\theta_0=0°} - \lambda_c|_{\theta_0=90°} = \qquad (33)$$

$$2\left(\frac{n_H d_H}{1} + \frac{n_L d_L}{1} - \frac{n_H d_H}{\sqrt{1-\frac{n_0^2}{n_H^2}}} - \frac{n_L d_L}{\sqrt{1-\frac{n_0^2}{n_L^2}}}\right) \text{ where:}$$

$$\Delta\lambda_c = \frac{\lambda_0}{4} F_c \qquad (34)$$

and $F_c$, the center wavelength dispersion factor, can be expressed as:

$$F_c = \left(2 - \frac{1}{\sqrt{1-\frac{n_0^2}{n_H^2}}} - \frac{1}{\sqrt{1-\frac{n_0^2}{n_L^2}}}\right) \qquad (35)$$

Figure 5:
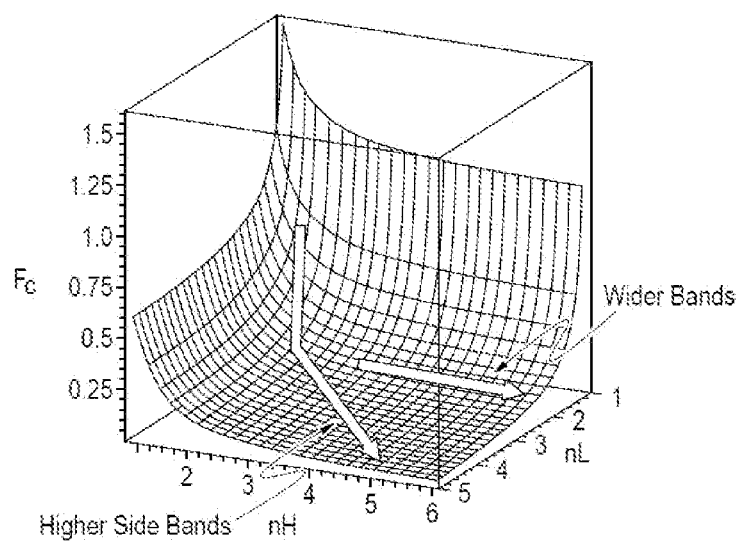
FIG. 5 is a plot of the center wavelength dispersion factor as a function of the index of refraction of the high and low index materials.

The center wavelength dispersion factor is shown in FIG. 5 as a function of high refractive index and low refractive index. Thus, from Equation (35) and FIG. 5, the dispersion of the center wavelength may be reduced with the proper selection of high and low refractive index materials. Also illustrated in FIG. 5 is a region indicated by the "Wider Bands" arrow where multi-layer photonic structures exhibiting a large difference between the high refractive index and the low refractive index will possess a wide reflection band even though the center wavelength dispersion factor is relatively low. Likewise, when the alternating layers possess a first material with a high refractive index material that approaches the low refractive index of the second material, higher side bands of the reflected electromagnetic radiation occur as illustrated by the "High side bands" arrow. The higher side bands can be reduced using a variety of methods, illustratively including the use of Rugate filters.

Referring again to FIG. 3, the broadband omni-directionally reflective multi-layer photonic structures described herein will have range to mid-range ratios from about 20% to about 50%. When the difference between range to mid-range ratio of the TE and TM modes is relatively large (e.g., where the range to mid-range values for the TE and TM modes diverge), a wide or large reflection band of the multi-layer photonic structure occurs.

In addition to the criteria for omni-directional reflectivity described above, a quarter wave technique may be used to determine the refractive indices and/or thicknesses of alternating layers of material for an omni-directional reflector. Using this method, the optical thicknesses of the high refractive index material and low refractive index material may be set to equal to each other and to one-fourth of a desired reflected wavelength. Thus, once the refractive indices of the multi-layer photonic structure have been selected, the thicknesses of the individual layers may be determined based on the following equation:

$$n_H d_H = n_L d_L = \frac{\lambda_o}{4} \qquad (36)$$

where $\lambda_0 = \lambda_c$ at $\theta_0 = 0$.

Accordingly, it should now be understood that, in order to produce a broadband, omni-directionally reflective photonic structure having a reflective bandwidth of at least 250 nm for angles of incidence up to about 80°, the aforementioned parameters may be used to design the structure.

Referring now to FIG. 6, one embodiment of a multi-layer photonic structure 100 is illustrated which may be used as an omni-directional, broadband reflector having a reflection band greater than about 250 nm for light having an angle of incidence θ from about 0° to about 80°. It will be understood that the angle of incidence θ, as used herein, is the angle between a ray of light 300 incident on the surface of the multi-layer photonic structure 100 and a normal N to the surface of the coating, as depicted in FIG. 6.

The multi-layer photonic structure 100 may comprise alternating layers of material with a relatively high index of refraction ($n_H$) (e.g., high index material 102) and layers of material with a relatively low index of refraction ($n_L$) (e.g., low index material 104). As described hereinabove, the present inventors have found that wide band omni-directional reflectors may have a range to mid-range ratio of about 20% to about 50% in both the transverse electric polarization mode and the transverse magnetic polarization mode such that the reflected light has equal components of both the TE and TM modes. Accordingly, the multi-layer photonic structure 100 shown in FIG. 6 may have a range to mid-range ratio from about 20% to about 50%.

Further, in order to produce a reflectivity band of greater than about 250 nm at an angle of incidence θ from about 0° to about 80°, the index of refraction $n_H$ of the high index material 102 may be from about 1.8 to about 3.5 while the index of refraction $n_L$ of the low index material 104 may be from about 1.3 to about 2.5. The refractive index contrast between the high index material and the low index material (e.g., $n_H - n_L$) may be from about 0.5 to about 2.2.

Table 1, shown below, contains a non-exclusive list of materials and their corresponding indices of refraction which may be utilized in the multi-layer photonic structures described herein. While Table 1 contains both metallic and non-metallic materials, it should be understood that, in one embodiment, the high index material and the low index material used in the multi-layer photonic structure 100 may be non-metallic materials such that the multi-layer photonic structure 100 is a metal-free, omni-directional broadband reflector.

TABLE 1

| Material | Index of Refraction (visible spectrum) |
|---|---|
| Germanium (Ge) | 4.0-5.0 |
| Tellurium (Te) | 4.6 |
| Gallium Antimonite (GaSb) | 4.5-5.0 |

TABLE 1-continued

| Material | Index of Refraction (visible spectrum) |
|---|---|
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide (As$_2$Se$_3$) | 2.8 |
| CuAlSe$_2$ | 2.75 |
| Zinc Selenide (ZnSe) | 2.5-2.6 |
| Titanium Dioxide (TiO$_2$) - solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1naphthyl)-4,4'Diamine (NPB) | 1.7 |
| Polyamide-imide (PEI) | 1.6 |
| Chromium (Cr) | 3.0 |
| Tin Sulfide (SnS) | 2.6 |
| Low Porous Si | 2.56 |
| Chalcogenide glass | 2.6 |
| Cerium Oxide (CeO$_2$) | 2.53 |
| Tungsten (W) | 2.5 |
| Gallium Nitride (GaN) | 2.5 |
| Manganese (Mn) | 2.5 |
| Niobium Oxie (Nb$_2$O$_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide (TiO$_2$) - vacuum deposited | 2.43 |
| Sodium Aluminum Fluoride (Na3AlF6) | 1.6 |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Fluoride (NaF) | 1.3 |
| Nano-porous Silica (SiO2) | 1.23 |
| Sputtered Silica (SiO2) | 1.47 |
| Vacuum Deposited Silica (SiO2) | 1.46 |
| Hafnium Oxide | 1.9-2.0 |

The alternating layers of high index material 102 and low index material 104 of the multi-layer photonic structure 100 may be deposited on a substrate 106. In the embodiment shown in FIG. 6, the multi-layer photonic structure generally comprises an odd number of layers with the initial layer (e.g., the layer directly adjacent the substrate 106) and the final layer (e.g., the upper-most layer of the coating shown in FIG. 6) comprising layers of high index material 102. For example, in the embodiment shown in FIG. 6, the coating structure 100 comprises five layers alternating between layers of high index material 102 and low index material 104. In general, however, it should be understood that the multi-layer photonic structure 100 may comprise at least three layers (e.g., one layer of low index material disposed between two layers high index materials). Accordingly, the high and low layers of the multi-layer photonic structure may be generally expressed as:

$$[H(LH)^N],$$

where H represents layers of high index materials and there corresponding thickness, L represents layers of low index materials and their corresponding thickness, and N is the number of layer pairs (e.g., a layer of high index material and a layer of low index material) and has an integer value greater than or equal to one. In the embodiment shown in FIG. 6, N is 2.

Still referring to the multi-layer photonic structure 100 shown in FIG. 6, each layer of high index material 102 comprises a thickness $d_H$ while each layer of low index material 104 comprises a thickness $d_L$ such that:

$$n_L d_L = n_H d_H = \frac{\lambda_0}{4},$$

where $\lambda_0$ is a particular wavelength of light incident on the coating. In particular, when the coating is designed to reflect a band of wavelengths, as described herein, $\lambda_0$ may represent a wavelength of light at the center of the band of wavelengths. Accordingly, each layer of the multi-layer photonic structure 100 may be referred to as comprising a quarter-wave thickness and the multi-layer photonic structure 100 may be alternatively referred to as a quarter-wave stack.

A non-limiting example of a broadband, omni-directional reflector having the multi-layer photonic structure depicted in FIG. 6 and its corresponding reflectivity properties will now be described with reference to a high index material and low index material having indices of refraction in the ranges specified above. In this example, the multi-layer photonic structure 100 may comprise a high index material with an index of refraction $n_H$ of about 3.5 and a low index material with an index of refraction $n_L$ of about 1.5 such that the refractive index contrast is about 2.0. The selected indices of refraction for the high index material 102 and the low index material 104 generally correspond to point "D" in FIG. 3 such that the multi-layer photonic structure 100 has a range to mid-range value between 40% and 50%. Suitable materials for the high index material and the low index material may include Indium phosphate (index of refraction=3.5) and Silica (index of refraction=1.5), respectively. However, it should be understood that other materials may be used to construct a multi-layer photonic structure 100 having the same omni-directional reflectivity properties.

In this particular example the multi-layer photonic structure 100 is a quarter-wave stack designed such that the reflectivity band is centered at a wavelength $\lambda_0$=520 nm. Accordingly, given the indices of refraction of the high index material and the low index material, each layer of high index material 102 has a thickness $d_H$ of about 37.1 nm while each layer of low index material 104 has a thickness $d_L$ of about 130 nm. In this example N=7 such that the multi-layer photonic structure comprises 15 layers.

Figure 7:
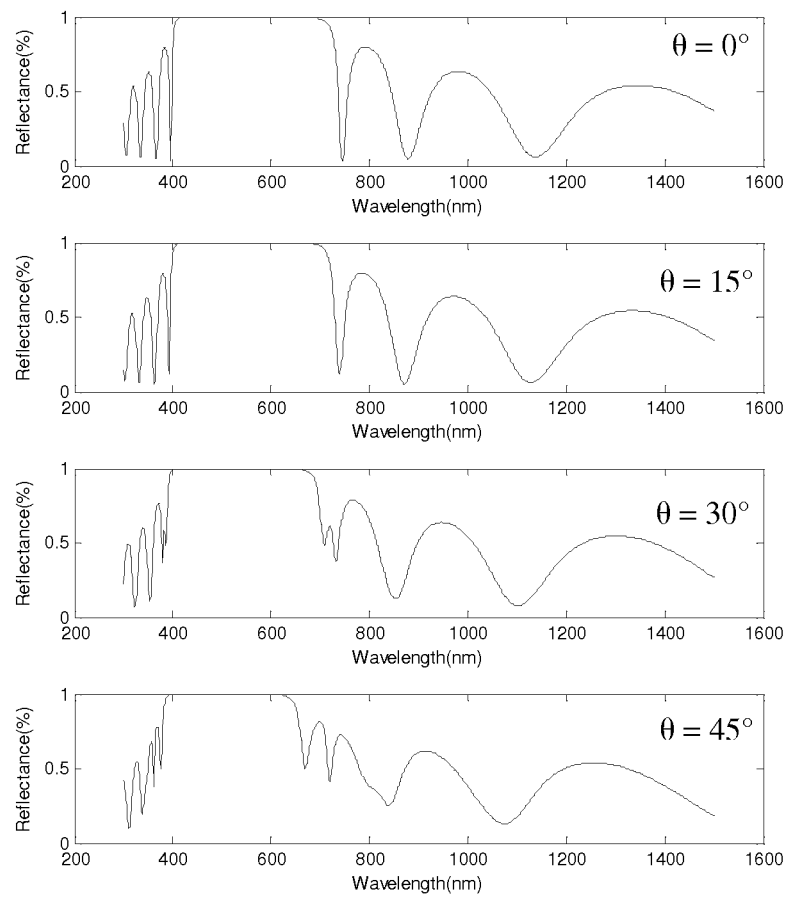
FIG. 7 graphically depicts reflectance as a function of wavelength for various angles of incident light on a multi-layer photonic structure similar to the structure illustrated in FIG. 6.

Referring now to FIG. 7, simulated reflectance spectra are shown for various angles θ (e.g., 0°, 15°, 30° and 45°) of incident light for the exemplary multi-layer photonic structure having the structure shown in FIG. 6 where the high index material 102 has an index of refraction $n_H$ of 3.5, the low index material 104 has an index of refraction $n_L$ and the reflectivity band is centered in the visible spectrum (e.g., in the range from about 420 nm-780 nm) at about 520 nm. The simulated reflectance spectra was determined using the matrix transfer method described herein at Appendix A. As shown in FIG. 7, the reflectivity band at 0° has a bandwidth greater than about 300 nm and the reflectivity in this bandwidth is 100%. As the angle of the incident light increases (e.g., as θ goes from 0° to 45°), the bandwidth of the coating shows a slight dependence on the angle of incident light. However, the reflectivity of the light within the band remains constant at about 100%.

Referring now to FIG. 2, the band structure of the multi-layer photonic structure 100 is shown for the exemplary multi-layer photonic structure of FIG. 6 with $n_H=3.5$ and $n_L=1.5$. The band structure is indicated for both TE and TM polarizations as a function of the incident angle of light on the structure, (shown in radians) as calculated from Equations (25) and (26) above. As shown in FIG. 2, the band width of the photonic structure is about 300 nm in width at 0° and narrows as the angle of incidence increases such that, at about 45°, the band width is about 250 nm. The angular dependency of the band width shown in FIG. 2 generally corresponds to the angular dependency of the reflectivity spectra shown in FIG. 7.

While the multi-layer photonic structure 100 described above comprises broadband omni-directional reflectivity for angles of incidence up to about 45°, the multi-layer photonic structure may be employed in a coating to provide the coating with broadband omni-directional reflectivity for angles of incidence greater than about 45°. For example, when the multi-layer photonic structure is used in a coating, as will be described in more detail herein, the multi-layer photonic structure may be reduced to discrete particles and mixed with pigment prior to being dispersed in a polymer matrix. After the pigment and discrete particles of the multi-layer photonic structure are dispersed in the matrix, the orientation of the discrete particles of the multi-layer photonic structure may be randomly oriented in the coating. As a result of this random orientation, the coating may behave as a broadband, omni-directional reflector for light with wavelengths within the reflectivity band of the multi-layer photonic structure and having an angle of incidence up to about 80° degrees with respect to a normal to the surface of the coating.

Figure 8:
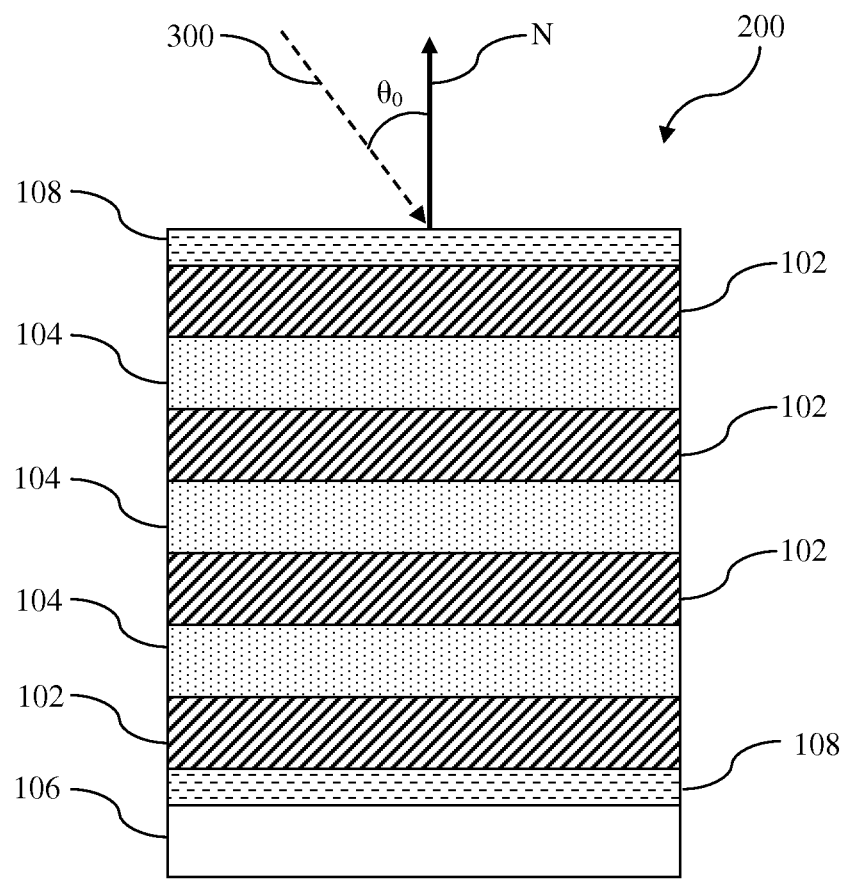
FIG. 8 is a schematic illustration of one embodiment a multi-layer photonic structure for use as a UV-IR reflector which is substantially transparent to visible light.

Referring now to FIG. 8, another embodiment of a multi-layer photonic structure 200 is illustrated which may be used as an omni-directional, broadband UV and IR reflector having a reflection band of greater than about 250 nm for light having an angle of incidence θ from about 0° to about 80°. The multi-layer photonic structure 200 in this embodiment is substantially transparent to wavelengths of visible light having an angle of incidence up to about 15°.

The multi-layer photonic structure depicted in FIG. 8 comprises alternating layers of high index material 102 and low index material 104 deposited on a substrate 106, as described above. However, in this embodiment, the multi-layer photonic structure additionally comprises two half layers of low index material 108A, 108B with a lower half layer of low of index material 108A disposed directly adjacent the substrate 106 and the upper half layer of low index material 108B comprising the upper most layer of the multi-layer photonic structure 200. The alternating layers of high index material 102 and low index material 104 are disposed between the lower and upper half layers of low index material 108A, 108B such that a layer of high index material 102 is directly adjacent to the lower half layer of low index material 108A and a layer of high index material 102 is directly adjacent to the upper half layer of low index material 108B. Accordingly, the multi-layer photonic structure may be generally expressed as:

[0.5LH(LH)$^N$0.5 L], where 0.5 L represents the half layers of low index material and their corresponding thicknesses, L represents layers of low index material and their corresponding thicknesses, H represents layers of high index material and their corresponding thicknesses, and N is the number of layer pairs (e.g., a layer of high index material and a layer of low index material) and has an integer value greater than or equal to one. In the embodiment shown in FIG. 8, N is 3. The multi-layer photonic structure shown in FIG. 8 may be a quarter wave stack, as described above, with each layer having a quarter wave thickness.

In the embodiment of the multi-layer photonic structure shown in FIG. 8, the upper and lower half layers of low index material 108A, 108B act as a filter which passes wavelengths of light in the visible spectrum (e.g., from about 420 nm to about 780 nm) while reflecting wavelengths of light in the UV and IR spectrums. Accordingly, the multi-layer photonic structure is transparent to wavelengths of light in the visible spectrum.

As described hereinabove, the multi-layer photonic structure 200 may have a range to mid-range value from about 20% to about 50% such that the multi-layer photonic structure has a sufficiently wide reflectivity band. In order to produce a reflectivity band of greater than about 250 nm at an angle of incidence θ from about 0° to about 80°, the index of refraction $n_H$ of the high index material 102 may be from about 1.8 to about 3.5 while the index of refraction $n_L$ of the low index material 104 may be from about 1.3 to about 2.5. The refractive index contrast between the high index material and the low index material (e.g., $n_H-n_L$) may be from about 0.5 to about 2.0. A non-exclusive list of materials suitable for making the multi-layer photonic structure is shown in Table 1, above.

A non-limiting example of a broadband, omni-directional reflector having the multi-layer photonic structure depicted in FIG. 8 and its corresponding reflectivity properties will now be described with reference to a high index material and low index material having indices of refraction in the ranges specified above. In this example, the multi-layer photonic structure 200 may comprise a high index material with an index of refraction $n_H$ of about 3.0 and a low index material with an index of refraction $n_L$ of about 1.5 such that the refractive index contrast is about 1.5. The selected indices of refraction for the high index material 102 and the low index material 104 generally correspond to point "E" in FIG. 3 such that the multi-layer photonic structure 200 has a range to mid-range value of approximately 20%. Suitable materials for the high index material and the low index material may include chromium (index of refraction=3.0) and silica (index of refraction=1.5), respectively. However, it should be understood that other materials may be used to construct a multi-layer photonic structure 200 having the same omni-directional reflectivity properties.

In this particular example the multi-layer photonic structure 200 is a quarter-wave stack designed such that the reflectivity band is centered at a wavelength $\lambda_0=1200$ nm in the IR spectrum. Accordingly, given the indices of refraction of the high index material and the low index material, each layer of high index material 102 has a thickness $d_H$ of about 100 nm while each layer of low index material 104 has a thickness $d_L$ of about 200 nm. Accordingly, the half layers of low index material have a thickness of 0.5*$d_L$ which is about 100 nm. In this example N=5 such that the multi-layer photonic structure comprises ten layers of high and low index materials and two half layers of low index material.

Figure 9:
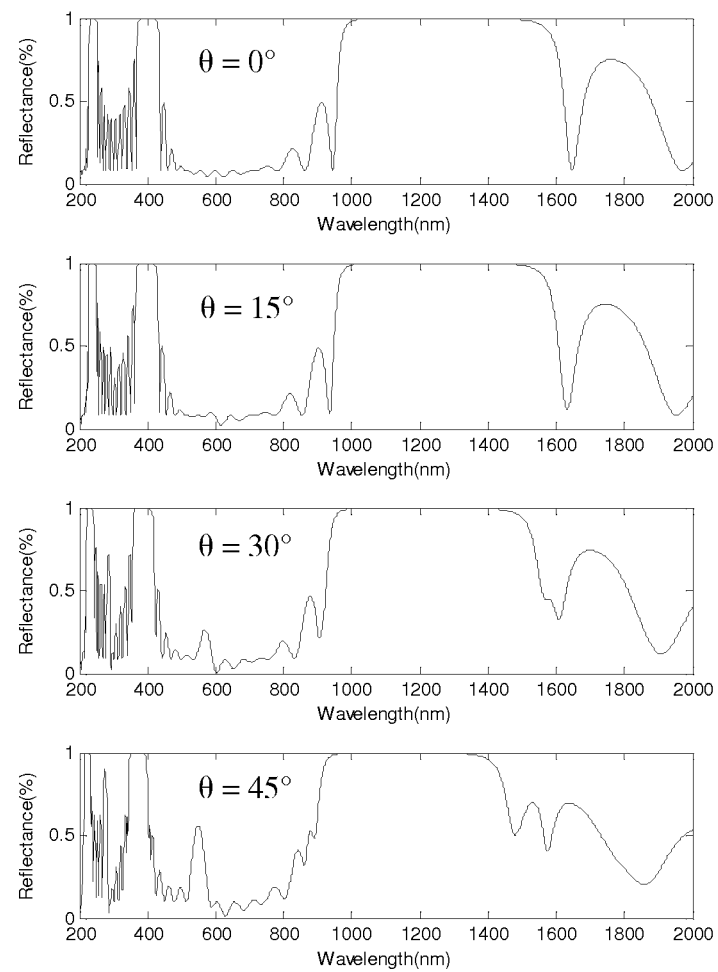
FIG. 9 graphically depicts the reflectance as a function of wavelength for various angles of incident light on a multi-layer photonic structure similar to that illustrated in FIG. 8.

Referring now to FIG. 9, simulated reflectance spectra are shown for various angles θ (e.g., 0°, 15°, 30° and 45°) of incident light for a multi-layer photonic structure similar to the structure shown in FIG. 8 where the high index material 102 has an index of refraction $n_H$ of 3.0, the low index material 104 has an index of refraction $n_L$ of 1.5 and the reflectivity band is centered in the infrared spectrum at about 1200 nm. As shown in FIG. 9, the reflectivity band at 0° has a bandwidth greater than about 250 nm in the IR spectrum and a bandwidth of about 100 nm in the UV spectrum. The reflectivity for wavelengths in both the IR and UV bandwidths is about 100%. However, at an angle of incidence of 0°, the multi-layer photonic structure is substantially transparent to wavelengths in the visible spectrum. As the angle of the incident light increases (e.g., as θ goes from 0° to 45°), the bandwidth in the IR and UV spectrums shows a slight dependence on the angle of incident light. However, the reflectivity of the light within the band remains constant at about 100%. A similar dependency is seen in the visible spectrum. However, as the angle of incidence increases beyond about 15°, the multi-layer photonic structure begins to reflect light at a wavelength between about 550 nm and 600 nm while remaining substantially transparent to wavelengths in the remainder of the visible spectrum. This effect causes the multi-layer photonic structure to have a color shifting effect when viewed from higher angles of incidence where the multi-layer photonic structure has a green cast or tint while being substantially transparent to visible light at lower angles of incidence.

Figure 10:
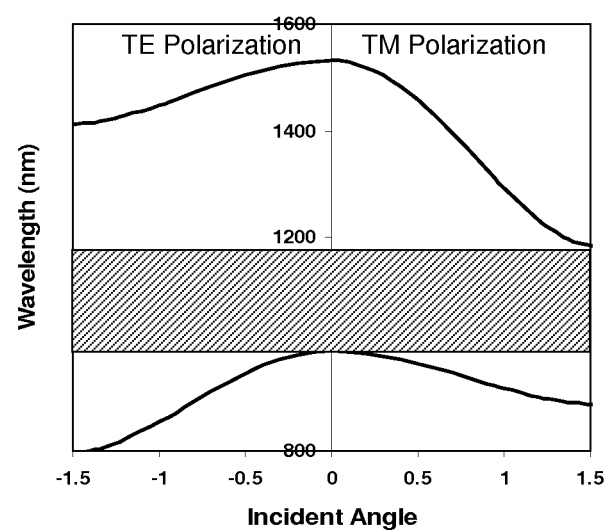
FIG. 10 graphically depicts the calculated photonic band structure in the infrared spectrum of a multi-layer photonic structure having similar to that illustrated in FIG. 8.

Referring now to FIG. 10, the band structure of the multi-layer photonic structure is shown for the exemplary multi-layer photonic structure with $n_H$=3.0 and $n_L$=1.5. The band structure is indicated for both TE and TM polarizations as a function of the incident angle of light on the structure, (shown in radians) as calculated from Equations (25) and (26) above. As shown in FIG. 10, the band width of the photonic structure 200 in the IR spectrum is greater than about 500 nm at 0° and narrows as the angle of incidence increases such that, at about 45°, the band width is about 450 nm. The angular dependency of the band width shown in FIG. 10 generally corresponds to the angular dependency of the reflectivity spectra shown in FIG. 9.

The multi-layer, omni-directional reflective multi-layer photonic structures described herein may be produced through a variety of material deposition and/or materials processing techniques including, without limitation, physical vapor deposition, chemical vapor deposition, sol gel processes, electron gun evaporation of alternating layers, vacuum evaporation of alternating layers, thermal evaporation, electrochemical deposition and etching processes, high-vacuum vapor deposition and oxidation processes, sputtering of alternating layers, molecular-beam epitaxy processes, thermal mechanical processing, chemical processing, polyelectrolyte multi-layer deposition by 'layer by layer' processing and/or combinations thereof. The aforementioned techniques may be used to deposit the multi-layer photonic structures on substrates formed from various material including, without limitation, metals, alloys, polymers, ceramics, glass and combinations thereof.

It should now be understood that the various multi-layer photonic structures described herein may be selectively employed to omni-directionally reflect specific wavelengths of electromagnetic radiation, and, in particular, wavelengths of electromagnetic radiation in the UV, visible and IR ranges of the electromagnetic spectrum. Accordingly, it will be understood that the multi-layer photonic structure may be directly applied to a substrate thereby imparting the omni-directional reflectivity of the multi-layer photonic structure to the substrate.

The multi-layer photonic structures described herein may also be formed into flakes or discrete particles and incorporated into a liquid carrier, such as an organic or inorganic binder, and utilized in a paint or similar coating system which may be applied to an article of manufacture thereby imparting the omni-directional reflectivity properties of the multi-layer photonic structure to the article. For example, the multi-layer photonic structures described herein may first be deposited onto a carrier substrate using the techniques described hereinabove. Thereafter, the multi-layer photonic structure is broken up into discrete particles or flakes. In one embodiment, the deposited multi-layer photonic structure may first be separated from the substrate before being broken up into discrete particles. For example, the substrate may be pealed from the multi-layer photonic structure, such as when the carrier substrate is a flexible, polymeric substrate, flexible alloy, or the like. Alternatively, the carrier substrate may be dissolved in a suitable solution thereby leaving behind the multi-layer photonic structure. The multi-layer photonic structure may also be pealed from the substrate. In another embodiment, the multi-layer photonic structure and substrate are both broken up into discrete particles without separating the multi-layer photonic structure from the substrate.

The multi-layer photonic structure may be reduced to flakes or discrete particles using various known techniques. For example, the multi-layer photonic structure may be milled or tumbled with milling media to crush the multi-layer photonic structure and reduce the particle size of any resulting flakes. In one embodiment, a pigment is mixed with the multi-layer photonic structure as the multi-layer photonic structure is reduced to discrete particles. The flakes or discrete particles of the multi-layer photonic structure may have an average thickness from about 0.5 microns to about 10 microns and an average diameter from about 10 microns to about 50 microns. The average thickness, as used herein, means the average value taken from at least three different thickness measurements and the term average diameter is defined as the average value taken from at least three different diameter measurements.

After the multi-layer photonic structure has been reduced to flakes, the multi-layer photonic structure may be incorporated into a paint or coating system. For example, the multi-layer photonic structure (with or without a pigment) may be dispersed in a polymer matrix such that the discrete particles of the multi-layer photonic structure are randomly oriented in the matrix. Thereafter, the paint or coating comprising the discrete particles of the multi-layer photonic structure may be deposited on an article of manufacture by spraying, electrostatic charging, powder coating, and the like. The deposited coating thereby imparting the omni-directional reflectivity of the multi-layer photonic structure to the substrate to which it is applied.

As described hereinabove, the omni-directional reflectivity properties of the multi-layer photonic structure may be imparted to the paint or coating system in which they are dispersed. Accordingly, the paint or coating system may behave as an omni-directional broadband reflector for various angles of light incident on the paint or coating. For example, when the discrete particles of the multi-layer photonic structure have a structure of the form depicted in FIG. 6, the paint or coating may behave as a broadband (e.g., having a reflectivity bandwidth greater than about 250 nm) omni-directional reflector for wavelengths of light in the UV, visible and infrared spectrums. Alternatively, when the discrete particles of the multi-layer photonic structure have a structure of the form depicted in FIG. 8, the paint or coating structure may behave as a broadband (e.g., having a reflectivity bandwidth greater than about 250 nm) omni-directional reflector for wavelengths of light in the UV and infrared spectrums while remaining substantially transparent to wavelengths of light in the visible spectrum. It should be understood that the random orientation of the discrete particles of the multi-layer photonic structure may produce omni-directional reflectivity in the paint or coating system for angles of light incident on the paint or coating from about 0° to about 80°.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

APPENDIX A

The "matrix method" refers to a methodology for calculating the reflectance and transmittance of a photonic structure using matrix algebra, as described in the Ph.D. thesis entitled "Fundamental Studies of Polyelectrolyte Multilayer Films: Optical Mechanical and Lithographic Property Control" by Adam John Nolte (Massachusetts Institute of Technology, 2007). The propagation of light, or, more generally, electromagnetic radiation (EM) in a photonic structure can be understood by examining the relevant physics over one layer of the structure.

The symbol "j" used herein refers to a layer of the photonic structure having an index of refraction and thickness of $n_j$ and $d_j$ respectively. In a photonic structure containing J distinguishable layers, there are J+1 interfaces in the structure. The incident medium (e.g., the medium adjacent to the upper-most layer of the structure) is labeled with a subscript of "0", and the substrate medium on which the photonic structure is deposited with a subscript of "J+1". Inside a layer j, EM radiation undergoes a shift in phase of $\delta_j$ such that:

$$\delta_j = \frac{2\pi \cdot n_j \cdot d_j \cdot \cos\theta_j}{\lambda} \quad (A1)$$

where $\lambda$ is the wavelength of the incident light, $\theta_j$ is the angle of refraction in layer j, which by Snell's Law is given by:

$$n_0 \sin \theta_0 = n_j \sin \theta_j \quad (A2)$$

where, by the notation introduced above $n_0$ and $\theta_0$ are the refractive index and angle of incidence in the incident medium, which is usually air ($n_0=1$).

Two different matrix formalisms can be developed from the considerations above. The first considers the total electric (E) and magnetic (H) field magnitudes at each particular interface. E and H are give by:

$$E_{j,TE} = E_j^+ + E_j^- \quad (A3\text{-}1)$$

$$H_{j,TE} = \eta_{j,TE} \cdot (E_j^+ - E_j^-) \quad (A3\text{-}2)$$

$$E_{j,TM} = (E_j^+ - E_j^-) \cdot \cos(\theta_j) \quad (A3\text{-}3)$$

$$H_{j,TM} = \eta_{j,TM} \cdot (E_j^+ + E_j^-) \cdot \cos(\theta_j) \quad (A3\text{-}4)$$

where the particular form of $\eta_j$, the optical admittance, depends upon the polarization:

$$\eta_{j,TE} = \sqrt{\frac{\varepsilon_0}{\mu_0}} \cdot n_j \cdot \cos\theta_j \text{ (for } TE(s) \text{ polarized radiation)} \quad (A4\text{-}1)$$

$$\eta_{j,TE} = \sqrt{\frac{\varepsilon_0}{\mu_0}} \cdot n_j \bigg/ \cos\theta_j \text{ (for } TM(p) \text{ polarized radiation)} \quad (A4\text{-}2)$$

It should be clear from Equations (A4-1) and (A4-2) that for normal incidence (where polarization is meaningless for filters with isotropic planar properties) $\eta_s = \eta_p$. The terms $\varepsilon_0$ and $\mu_0$ are known as the permittivity and permeability of a vacuum, respectively, where $$\mu_0 = 4\pi \cdot 10^{-7} \frac{H}{m}$$

and $$\varepsilon_0 = \frac{1}{c^2 \cdot \mu_0} \approx 8.85 \cdot 10^{-12} \frac{F}{m}$$

where c is the speed of light in a vacuum.

The above equations yield the following matrix equation that relates the electric and magnetic fields at interfaces j and j+1 in terms of the properties of layer j:

$$\begin{bmatrix} E_J \\ H_j \end{bmatrix} = \begin{bmatrix} \cos\delta_j & \frac{i \cdot \sin\delta_j}{\eta_j} \\ i \cdot n_j \cdot \sin\delta_j & \cos\delta_j \end{bmatrix} \begin{bmatrix} E_{j+1} \\ H_{j+1} \end{bmatrix} \quad (A6)$$

$$= M_J \begin{bmatrix} E_{J+1} \\ H_{j+1} \end{bmatrix}$$

where $M_j$ is known as the characteristic matrix of layer j. A total transfer matrix ($M_T$), or characteristic matrix for the entire photonic structure, can be obtained by multiplying the characteristic matrices for the individual layers such that $$M_T = M_1 \cdot M_2 \ldots M_J \quad (A7\text{-}1)$$

$$= \prod_{J=1}^{J} M_J$$

$$= \begin{bmatrix} m_{11} m_{12} \\ m_{21} m_{22} \end{bmatrix}$$

$$\begin{bmatrix} E_0 \\ H_0 \end{bmatrix} = M_T \begin{bmatrix} E_{J+1} \\ H_{J+1} \end{bmatrix} \quad (A7\text{-}2)$$

The amplitude reflection (r) and transmission (t) coefficients can be found from $M_T$ as follows:

$$r_{TE} = \frac{E_0^-}{E_0^+} \quad (A8\text{-}1)$$

$$= \frac{\eta_{0,TE} m_{11} + \eta_{0,TE} \eta_{J+1,TE} m_{12} - m_{21} - \eta_{J+1,TE} m_{22}}{\eta_{0,TE} m_{11} + \eta_{0,TE} \eta_{J+1,TE} m_{12} + m_{21} + \eta_{J+1,TE} m_{22}}$$

-continued $$t_{TE} = \frac{E_{J+1}^+}{E_0^+} \quad (A8\text{-}2)$$

$$= \frac{2\eta_{0,TE}}{\eta_{0,TE}m_{11} + \eta_{0,TE}\eta_{J+1,TE}m_{12} + m_{21} + \eta_{J+1,TE}m_{22}}$$

$$r_{TM} = \frac{\eta_{0,TM}m_{11} + \eta_{0,TM}\eta_{J+1,TM}m_{12} - m_{21} - \eta_{J+1,TM}m_{22}}{\eta_{0,TM}m_{11} + \eta_{0,TM}\eta_{J+1,TM}m_{12} + m_{21} + \eta_{J+1,TM}m_{22}} \quad (A8\text{-}3)$$

$$t_{TM} = \frac{2\eta_{0,TM}}{\eta_{0,TM}m_{11} + \eta_{0,TM}\eta_{J+TM}m_{12} + m_{21} + \eta_{J+1,TM}m_{22}}, \quad (A8\text{-}4)$$

$$\frac{\cos(\theta_0)}{\cos(\theta_s)}$$

from which the reflectance (R) and transmittance (T), which are the actual fractions of reflected and transmitted radiation intensity, respectively can be calculated:

$$R = r \cdot r^* \quad (A9\text{-}1)$$

$$T = t \cdot t^* \cdot \frac{\Re(n_s) \cdot \cos[\Re(\theta_s)]}{\Re(n_0) \cdot \cos[\Re(\theta_0)]}. \quad (A9\text{-}2)$$

$$A = 1 - R - T \quad (A9\text{-}3)$$

A is the absorptance which is the fraction of the incident power that is absorbed by the structure and not reflected or transmitted. Equations A9-1-A9-3 may be used in conjunction with a photonics calculator to solve for the reflectance (R) and transmittance (T) of the photonics calculator.

What is claimed is:

1. A multi-layer photonic structure comprising alternating layers of high index material and low index material having a form [0.5 L H (LH)$^N$ 0.5 L] where H is a layer of high index material, L is a layer of low index material, 0.5 L are half layers of low index material positioned on a top and a bottom of the multilayer photonic structure, and N is a number of pairs of layers of high index material and layers of low index material, wherein:

N is an integer≥1;
the low index material has an index of refraction $n_L$ from about 1.3 to about 2.5;
the high index material has an index of refraction $n_H$ of greater than or equal to about 3.0;
the multilayer photonic structure is substantially transparent to visible wavelengths of light and has an IR reflectivity band and a UV reflectivity band; and
the multi-layer photonic structure has a range to mid-range ratio greater than about 20% in a transverse electric mode and a transverse magnetic mode, and wherein the range to mid-range ratio for the transverse electric mode is determined by $$\eta_{TE} = 2\frac{\lambda_{long}^{TE}(\theta_0 = 90°) - \lambda_{Short}^{TE}(\theta_0 = 0°)}{\lambda_{long}^{TE}(\theta_0 = 90°) + \lambda_{Short}^{TE}(\theta_0 = 0°)},$$

where $\lambda_{long}^{TE}$ a first band edge for a first long wavelength in the transverse electric mode and $\lambda_{short}^{TE}$ is a second band edge for a first short wavelength in the transverse electric mode, and the range to mid-range ratio for the transverse magnetic mode is determined by $$\eta_{TM} = 2\frac{\lambda_{long}^{TM}(\theta_0 = 90°) - \lambda_{Short}^{TM}(\theta_0 = 0°)}{\lambda_{long}^{TM}(\theta_0 = 90°) + \lambda_{Short}^{TM}(\theta_0 = 0°)},$$

where $\lambda_{long}^{TM}$ is a third band edge for a second long wavelength in the transverse magnetic mode and $\lambda_{short}^{TM}$ is a fourth band edge for a second short wavelength in the transverse magnetic mode.

2. The multi-layer photonic structure of claim 1, wherein the multi-layer photonic structure is a flake.

3. The multi-layer photonic structure of claim 2, wherein the flake comprises an average thickness from about 0.5 microns to about 10 microns and an average diameter from about 10 microns to about 50 microns.

4. The multi-layer photonic structure of claim 1, wherein the high index material has an index of refraction $n_H$ of less than or equal to about 5.0.

5. The multi-layer photonic structure of claim 1, wherein the half layers of low index material pass visible wavelengths of light and reflect UV and IR wavelengths of light.

6. The -layer photonic structure of claim 1, wherein a reflectance of the multilayer photonic structure is about 100% within the IR reflectivity band and within the UV reflectivity band for light having angles of incidence from about 0 degrees to about 80 degrees relative to the multi-layer photonic structure.

7. The multi-layer photonic structure of claim 1, wherein the IR reflectivity band is greater than about 250 nm and the UV reflectivity band is greater than about 100 nm for light having angles of incidence from about 0 degrees to about 45 degrees relative to the multi-layer photonic structure.

8. The multi-layer photonic structure of claim 1, wherein the high index material and the low index material are non-metallic materials.

9. A UV-IR reflective multilayer photonic structure comprising layers of high index material and low index material having a form [0.5 L H (LH)$^N$ 0.5 L] where H is a layer of high index material, L is a layer of the low index material, 0.5 L are half layers of low index material positioned on a top and a bottom of the multilayer photonic structure, and N is the number pairs of layers of high index material and layers of low index materials, wherein:

N is an integer≥1;
the low index material has an index of refraction $n_L$ from about 1.3 to about 2.5;
the high index material has an index of refraction $n_H$ of greater than or equal to about 3.0;
the multi-layer photonic structure comprises a reflectivity band for light in the infrared spectrum and a reflectivity band for light in the ultraviolet spectrum; and
the multi-layer photonic structure has a range to mid-range ratio greater than about 20% in a transverse electric mode and a transverse magnetic mode, and wherein the range to mid-range ratio for the transverse electric mode is determined by $$\eta_{TE} = 2\frac{\lambda_{long}^{TE}(\theta_0 = 90°) - \lambda_{Short}^{TE}(\theta_0 = 0°)}{\lambda_{long}^{TE}(\theta_0 = 90°) + \lambda_{Short}^{TE}(\theta_0 = 0°)},$$

where $\lambda_{long}^{TE}$ is a first band edge for a first long wavelength in the transverse electric mode and $\lambda_{short}^{TE}$ is a second band edge for a first short wavelength in the transverse electric mode, and the range to mid-range ratio for the transverse magnetic mode is determined by $$\eta_{TM} = 2\frac{\lambda_{long}^{TM}(\theta_0 = 90°) - \lambda_{Short}^{TM}(\theta_0 = 0°)}{\lambda_{long}^{TM}(\theta_0 = 90°) + \lambda_{Short}^{TM}(\theta_0 = 0°)},$$

where $\lambda_{long}^{TM}$ is a third band edge for a second long wavelength in the transverse magnetic mode and $\lambda_{short}^{TM}$ is a fourth band edge for a second short wavelength in the transverse magnetic mode.

10. The multi-layer photonic structure of claim 9, wherein the high index material has an index of refraction $n_H$ of less than or equal to about 5.0.

11. The multi-layer photonic structure of claim 9, wherein the multi-layer photonic structure comprises a reflectivity band greater than about 450 nm for light in the infrared spectrum having an angle of incidence from about 0 degrees to about 45 degrees.

12. The multi-layer photonic structure of claim 9, wherein an index contrast between the high index material and the low index material is from about 0.5 to about 2.0.

13. The multi-layer photonic structure of claim 9, wherein the multi-layer photonic structure is a flake.

14. The multi-layer photonic structure of claim 13, wherein the flake has an average thickness from about 0.5 microns to about 10 microns.

15. The multilayer photonic structure of claim 13, wherein the flake has an average diameter from about 10 microns to about 50 microns.

16. The multi-layer photonic structure of claim 9, wherein the range to mid-range ratio in the transverse electric mode or the transverse magnetic mode is from about 20% to about 50%.

17. An article of manufacture comprising a broadband omni-directionally reflective coating substantially transparent to visible light and having a first reflectivity band having a bandwidth for light in the infrared spectrum and a second reflectivity band for light in the ultraviolet spectrum, the coating comprising:
a binder and a plurality of multi-layer photonic structures dispersed in the binder, wherein the multi-layer photonic structures have a range to mid-range value in a transverse electric mode and a transverse magnetic mode from about 20% to about 50%, wherein the multilayer photonic structure comprises layers of high index material and low index material having a form $[0.5\ L\ H(LH)^N\ 0.5\ L]$ where H is a layer of high index material, L is a layer of the low index material, N is the number of pairs of layers of high index material and layers of low index materials, 0.5 L are half layers of low index material positioned on a top and a bottom of the multilayer photonic structure, wherein:

N is an integer $\geq 1$;

the low index material has an index of refraction $n_L$ from about 1.3 to about 2.5;

the high index material has an index of refraction $n_H$ of greater than or equal to about 3.0; and the range to mid-range ratio for the transverse electric mode is determined by $$\eta_{TE} = 2\frac{\lambda_{long}^{TE}(\theta_0 = 90°) - \lambda_{Short}^{TE}(\theta_0 = 0°)}{\lambda_{long}^{TE}(\theta_0 = 90°) + \lambda_{Short}^{TE}(\theta_0 = 0°)},$$

where $\lambda_{long}^{TE}$ a first band edge for a first long wavelength in the transverse electric mode and $\lambda_{short}^{TE}$ is a second band edge for a first short wavelength in the transverse electric mode, and the range to mid-range ratio for the transverse magnetic mode is determined $$\eta_{TM} = 2\frac{\lambda_{long}^{TM}(\theta_0 = 90°) - \lambda_{Short}^{TM}(\theta_0 = 0°)}{\lambda_{long}^{TM}(\theta_0 = 90°) + \lambda_{Short}^{TM}(\theta_0 = 0°)},$$

where $\lambda_{long}^{TM}$ is a third band edge for a second long wavelength in the transverse magnetic mode and $\lambda_{short}^{TM}$ is a fourth band edge for a second short wavelength in the transverse magnetic mode.

18. The article of manufacture of claim 17, wherein the high index material has an index of refraction $n_H$ of less than or equal to about 5.0.

19. The article of manufacture of claim 17, wherein the multi-layer photonic structures are flakes.

20. The article of manufacture of claim 19, wherein the flakes comprise an average thickness from about 0.5 microns to about 10 microns and an average diameter from about 10 microns to about 50 microns.

* * * * *